United States Patent [19]

Bowles

[11] 4,120,322
[45] Oct. 17, 1978

[54] HYDRO-FLUIDIC TEMPERATURE SENSOR AND CONTROL SYSTEM

[76] Inventor: Romald E. Bowles, 2105 Sondra Ct., Silver Spring, Md. 20904

[21] Appl. No.: 571,012

[22] Filed: Apr. 22, 1975

[51] Int. Cl.² .............................................. F15C 1/18
[52] U.S. Cl. ......................................... 137/842; 73/54
[58] Field of Search ............... 137/842, 807, 819, 834, 137/825; 73/54

[56] References Cited

U.S. PATENT DOCUMENTS

| 3,234,955 | 2/1966 | Auger | 137/842 |
| 3,428,068 | 2/1969 | Howie, Jr. | 137/842 |
| 3,502,092 | 3/1970 | Metzger | 137/842 |
| 3,557,810 | 1/1971 | Lomas | 137/825 X |
| 3,785,390 | 1/1974 | Taylor | 137/842 X |

*Primary Examiner*—William R. Cline
*Attorney, Agent, or Firm*—Rose & Edell

[57] ABSTRACT

A hydraulic turbulence amplifier is provided for measuring and controlling the temperature of a liquid supplied to the power nozzle of the amplifier, i.e., the working fluid. As a result of the high pressures at which the laminar-to-turbulence flow transition occurs power applications without additional amplification is feasible. A crossover capability for the output of two sensor-amplifiers operated at different values of supply pressure enables temperature or pressure control systems to be provided.

6 Claims, 17 Drawing Figures

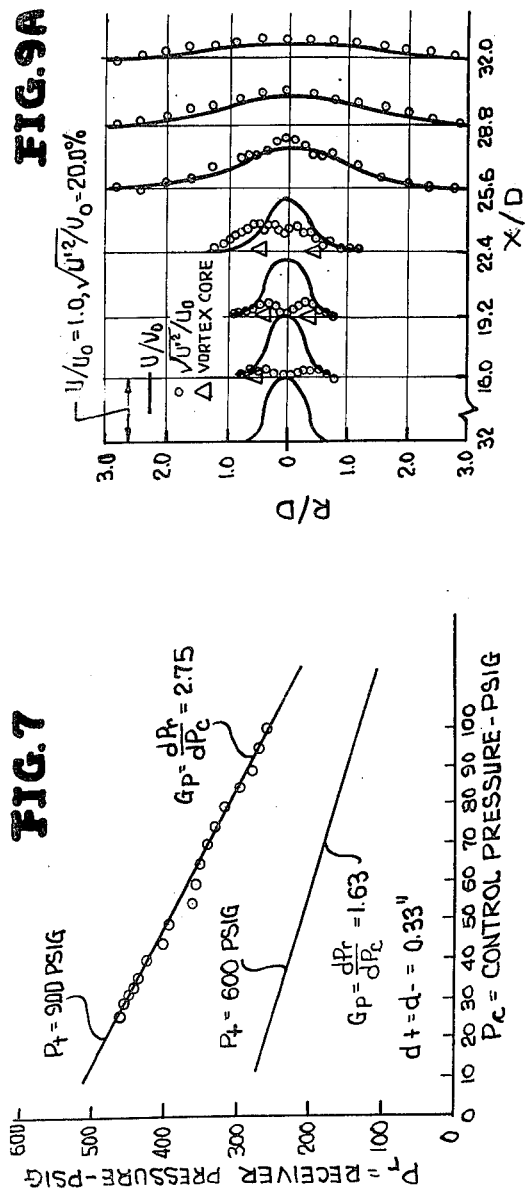
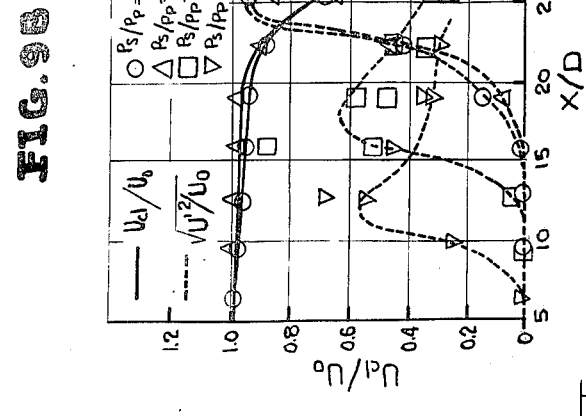
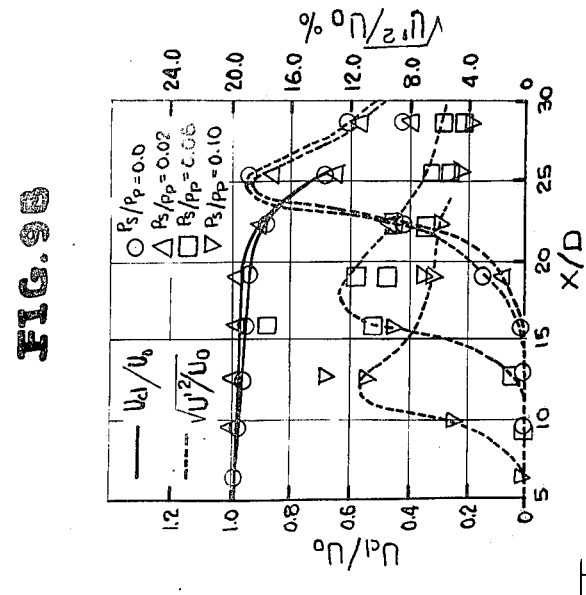
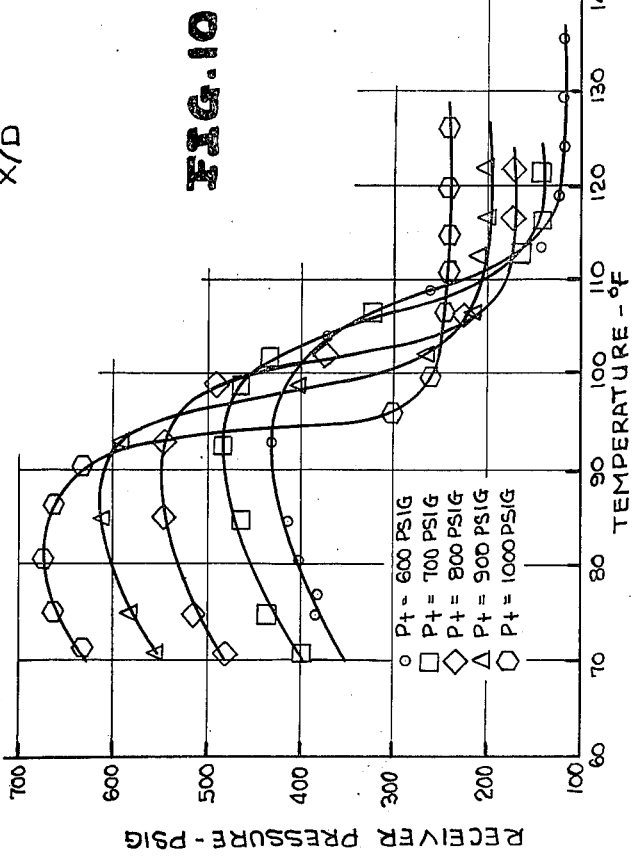
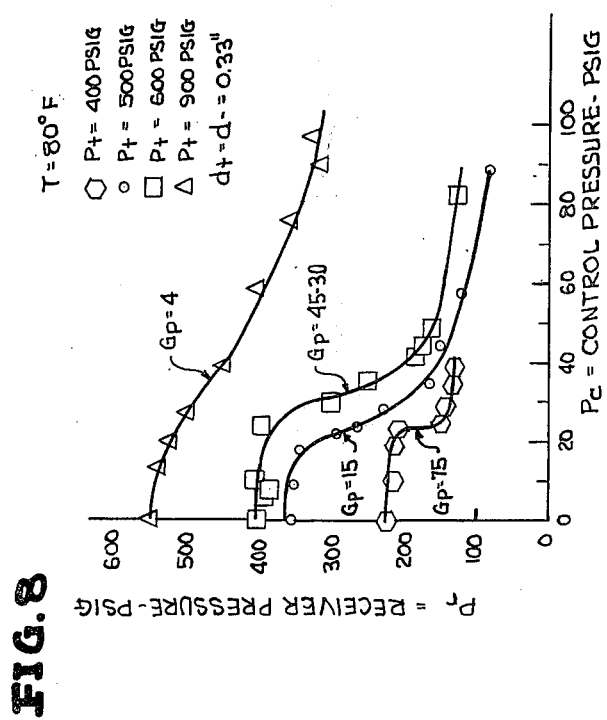

HYDRO-FLUIDIC TEMPERATURE SENSOR AND CONTROL SYSTEM

PRIOR ART

Pneumatic turbulence amplifiers have been known in the basic form since the late nineteenth century and in more recent years have been utilized as central components in fluidic systems. Such turbulence amplifiers, however, operate at quite low pressure ranges and as such are not particularly useful in industrial applications. The pressure at which these amplifiers operate can be raised by use of very small power nozzle orifices but such overall sizes are not compatible with industrial applications.

SUMMARY OF THE INVENTION

It has been found that turbulence amplifiers operated with a submerged liquid jet operate at quite high pressures; sufficiently high that they may be utilized in industrial applications to produce signals that may be employed without further amplification. The size of the units are such that the industrial environment does not produce particular problems with their use.

Of particular interest is the fact that the laminar-to-turbulent transition is quite temperature sensitive and thus the units lend themselves quite readily to industrial temperature measuring on control devices.

Hydraulic fluid the temperature of which is to be monitored and/or controlled is passed through a power nozzle to form an initially laminar submerged jet which impinges on a receiver orifice providing an output signal. The power nozzle pressure level is regulated when sensing temperature to eliminate pressure effects in the laminar-to-turbulence transition. The hydraulic fluid physical properties which are temperature dependent cause transition of a portion of the jet from laminar-to-turbulent flow in an amount depending on fluid temperature. This together with other conventional temperature effects on fluid flow characteristics results in an output signal that is highly temperature dependent. Selection of the working fluid, hardward dimensions and supply pressure level enable determination of the temperature at which the laminar-to-turbulent flow transaction occurs and the slope of the transition curve. By appropriately selecting these parameters multiple parallel devices may be employed wherein the output pressure versus liquid supply temperature curves cross each other and so provide a differential output signal which is a function of temperature of the working fluid. The differential signal is used to control flow of the working fluid and/or cooling of the working fluid to regulate the working fluid temperature so as to achieve a desired level of temperature.

Further the differential signal thus provided may be employed in a highly sensitive absolute temperature measuring device or a temperature alarm system.

It is an object of the present invention to provide a hydraulic turbulence amplifier for measuring and/or regulating temperature of a working liquid.

It is another object of the present invention to provide a hydraulic, power, turbulence amplifier capable of measuring and/or controlling the temperature of a high pressure liquid.

It is still another object of the present invention to provide a hydraulic turbulence amplifier for measuring and/or controlling temperature of the power liquid of the amplifier, which amplifier may utilize a central jet.

BRIEF DESCRIPTION OF THE DRAWINGS

FIG. 7 presents hydraulic amplifiers characteristics at 60° F. for 600 and 900 psig supply pressure levels.

FIG. 8 presents the hydraulic turbulence amplifiers characteristic at 80° F. for supply pressure levels of 400, 500, 600, and 900 psig.

FIGS. 9A and 9B present the laminarization of the power jet by a low power control jet. In particular, FIG. 9A shows the velocity and turbulence intensity profiles in an undisturbed jet ($P_s/P_p = 0.00$) and FIG. 9B shows the variation in centerline velocity and turbulence intensity for several levels of control signal.

FIG. 10 presents experimental data as to pressure recovery versus temperature of hydraulic fluid for constant supply pressures of 600, 700, 800, 900 and 1000 psig.

DETAILED DESCRIPTION OF THE INVENTION

Even a cursory survey of available industrial devices makes it evident that when very high pressures are to be used the equipment available is hydraulic rather than pneumatic. No matter what the type of actuator, in every case hydraulic systems provide a higher pressure range than the pneumatic equipment. Part of the reason is that even at these very high pressures one can largely ignore compressability of the liquid in a hydraulic system. Consequently, hydraulic systems can be very stiff mechanically. Since a major limitation on speed of response is the resonant frequency of the load acting against the equivalent spring force of the driver, it is desirable that this spring be as stiff as possible. Thus the hydraulic system has an advantage. The above and many other factors direct attention towards hydraulic fluidics and particularly turbulence amplifiers.

Figure 1:
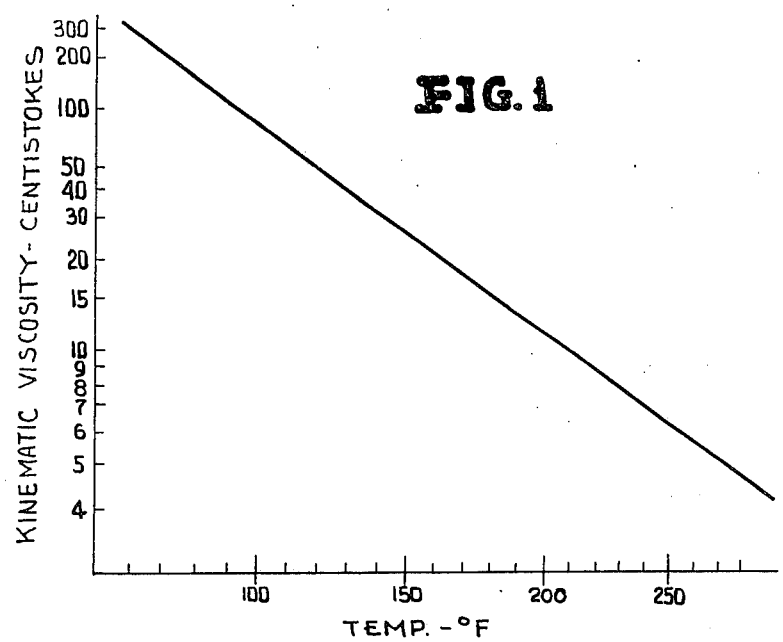
FIG. 1 presents the temperature-viscosity relationship of one conventional hydraulic fluid ESSO-MAR EP 56.
Figure 2:
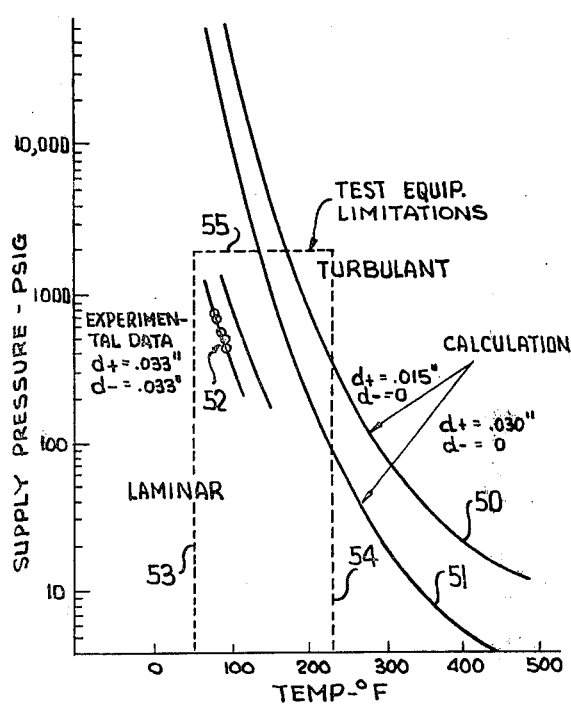
FIG. 2 presents calculated and experimental pressure-temperature relationships for transition of a hydraulic fluid jet of the fluid of FIG. 1.

Prior work by the inventor with liquid turbulence amplifiers using water as a working fluid indicated a significantly higher operating pressure range than was provided with pneumatic units of the same size. It was found that liquids were available which could provide dramatic changes in the operating point of the turbulence amplifier with realistic sizes of the power nozzle. For example, FIG. 1 presents the viscosity versus temperature relationship for a conventional hydraulic fluid, ESSO-MAR ER 56 over a temperature region of interest. FIG. 2 shows the relationship between "operating point pressure" (maximum supply pressure at the "knee" of the turbulence curve) and "working fluid temperature" for this fluid for two different size power nozzles 0.015 and 0.03011. These curves are for a quiet environment, a homogeneous power liquid, a homogeneous liquid surrounding the power jet at the same temperature as the power jet, and with no control signal. The pressures of possible operation extend well above those required in most industrial applications.

The turbulence amplifier has achieved a high degree of acceptability as a digital control component in pneumatic fluidic systems. Because of the exceptionally high gain and low operating pressure of this unit it has not been practical to operate the device as staged or general analog components, but rather only in its two saturated states (laminar and turbulent). However, in hydraulic fluids analog operation is made possible in a temperature sensing apparatus by virtue of the large variation of output pressure and the inverse variation of viscosity with temperature. Such a unit therefore is applicable to analog systems where temperature as well as pressure vary.

Tests conducted with the temperature held constant, show that the basic laminar-turbulence phenomenon is unchanged whether the working fluid be air (gas) or hydraulic fluids. This is significant insofar as the vast research which has been performed in air may be applied to hydraulic fluids if one accounts for the different effects of the variable, temperature.

The general effect of temperature on the output pressure of a turbulence amplifier may be determined by investigation of the critical Reynolds Number of the jet. That is, because the output pressure drops significantly when the jet undergoes transition to turbulent flow, this transition may be taken as the dependent variable. In general, one can predict the point downstream from the exit plane of the nozzle where transition begins, by comparison of Reynolds Numbers with those of known pneumatic turbulence amplifiers. In this case a simpler Reynolds Number (R) may be used to provide similarity rather than quantitatively predicting transition itself; namely, $$R = Vd_{30}/v \qquad (1)$$

where
$V$ = jet efflux velocity = $\sqrt{2P_+\rho w}$
$d_+$ = nozzle diameter for the power nozzle
$v$ = fluid kinematic viscosity
$\rho_w$ = density of water at 60° F.
$P_+$ = supply pressure Experience using air has shown that the following numerical values yield a successful turbulence amplifier:
$P_+$ = 12 inches H$_2$O
$d_+$ = 0.030 inches.

At room temperature ($v = 160 \times 10^{-6}$ ft$^2$/sec) the similarity Reynolds Number (eq. 1) becomes R = 3560.

Therefore, for comparable performance in hydraulic fluids one would prescribe $$3560 = (Vd_{30}/v) \text{ hydraulic fluid} \qquad (2)$$

For hydraulic fluids, $v$ is commonly expressed in centistokes, and therefore the above equation is best written as $Vd/v = 3.82 \times 10^{-2}$, where $v$ is now the kinematic viscosity in centistokes, V the jet velocity in ft/sec, and $d_+$ the jet diameter in feet. Deriving the velocity from the dynamic head as was done earlier (eq. 1), and introducing the concept of specific gravity, $$V = \sqrt{2P_+/\rho w^S} \qquad (3)$$

where
$P$ = supply pressure — psf.
$\rho$ = density of water at 60° F.
$S$ = Specific gravity of the hydraulic fluid.

The specific gravity of the hydraulic fluid ESSO-MAR EP 56 which was employed in the tests described hereinafter can be given by the linear relationship $S = 0.8954 - 0.00034t$, $t$ being the temperature in degrees Fahrenheit. After suitable conversion of units to these more conventionally employed, the similar Reynolds number in hydraulic fluid becomes $$\sqrt{\frac{0.97P}{0.8954 - 0.00034(t)}} \frac{d}{v} = 3.82 \times 10^{-2} \qquad (4)$$

In which the units are:
$P$ = psi
$d$ = inches
$v$ = centistokes
$t$ = ° Fahrenheit Finally, the temperature-viscosity relationship for the hydraulic fluid is derived from the manufacturer's experimental data which is reproduced in FIG. 1 where the abscissa is Temperature in degrees Fahrenheit and the ordinate is kinematic viscosity in centistokes per ESSP-MAR EP 56.

$$v = (10)^{3 \, (10 - 0.00477(5/9(t-32)))} \qquad (5)$$

$v$ = centistokes
$t$ = ° Fahrenheit

Substitution of eq. 5 into eq. 4 and solving for P yields the supply pressure at which transition takes place as a function of temperature:

$$P \approx \left( \frac{0.8954 - 0.00034t}{0.97} \right) \left( \frac{(3.82 \times 10^{-2})(10^{3(10(-0.00477(5/9(t-32))))}}{d} \right)^2 \qquad (6)$$

The results of the computation are shown in FIG. 2. Of particular interest is the pressure levels and also the slope of the curve, $\Delta P/\Delta t$. Both of these indicate that this component has both high temperature sensitivity and high power capability. FIG. 2 presents the supply pressure at which the "knee" of the turbulence amplifier characteristic occurs (peak pressure of a curve as shown in FIG. 10) as ordinate versus working fluid temperature as abscissa. The calculations are based on a power nozzle inside diameter $d+$ of 0.015 inch for curve 50 with a receiver ID $d-$ of 0 i.e., dead headed. For curve 51, $d+$ = 0.030 inch and $d-$ = 0. inch. The circled points 52 are experimental data using the test hardware of FIGS. 3 and 14. As a generalization in FIG. 2 one can consider regions to the left of a curve as dominently laminar power jet conditions and regions to the right of a curve as dominently turbulent power jet conditions. The dashed lines 53, 54 and 55 indicate limitations of the hydraulic test stand as used for the experimental data.

Figure 3A:
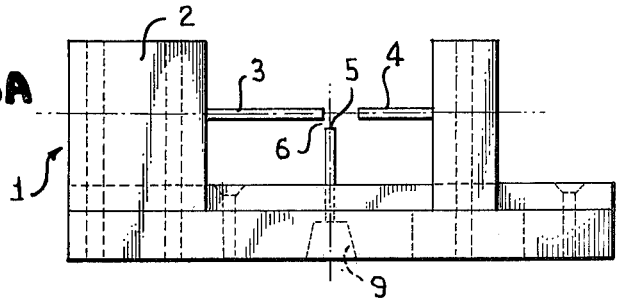
FIG. 3A presents a side view of a fluidic sensor-amplifier with optional control jet.
Figure 3B:
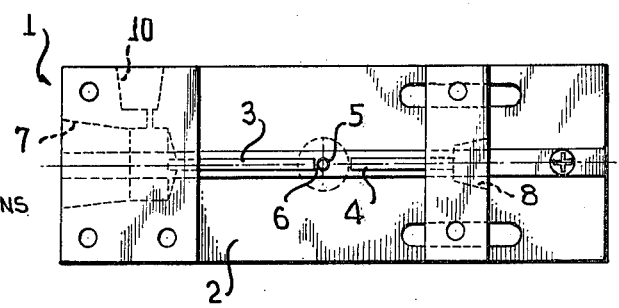
FIG. 3B presents a top view of the fluidic sensor-amplifier with optional control jet.
Figure 14A:
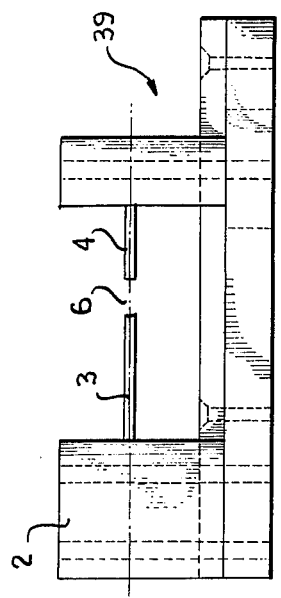
FIG. 14A presents a side view of a sensor-amplifier having no control nozzle.
Figure 14B:
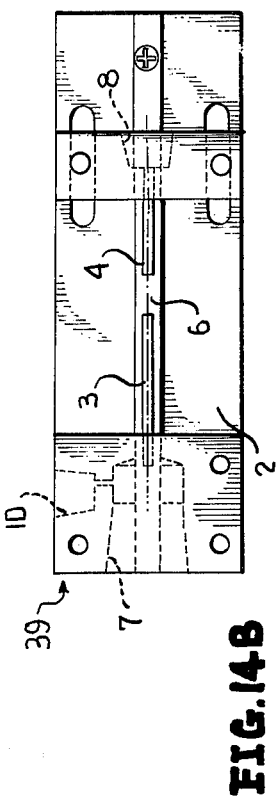
FIG. 14B presents a top view of a sensor-amplifier having no control nozzle.

FIG. 3A presents a side view and FIG. 3B a top view of a sensor-amplifier 1 of a type used in the experiment. A body structure 2 is brass of a thickness selected simply to provide adequate thread engagement for the NPT fittings. A power nozzle 3, a receiver 4 and an optional control nozzle 5 are of 1/32 ID telescoping brass tubing having smooth interiors, no burrs and externally chamfered ends. These tubes 3, 4, and 5 were soldered to the body 2. The volume of space between and in the near vicinity of the exposed ends of the power nozzle 3, receiver 4 and optional control nozzle 5 is termed interaction region 6. The power nozzle 3 is supplied fluid via a fitting 7. The output signal from the receiver 4 was accessed via fitting 8. A fitting 9 provides for application of a control signal. Fitting 10 provides access to measure $P_+$, the power nozzle 3 supply pressure. The body structure 2 permits adjustment of the relative location and orientation of the power nozzle 3 and receiver 4. These two tubes 3 and 4 are desirably concentric. Separation of the receiver 4 entrance from the exit of the power nozzle 3 is of the order of ten times the ID of the power nozzle 3. FIG. 14 presents the sensor amplifier 1 without the optional control nozzle 5 as sensor-amplifier 39 for clarity. Additional size power nozzles may also be employed.

Figure 4:
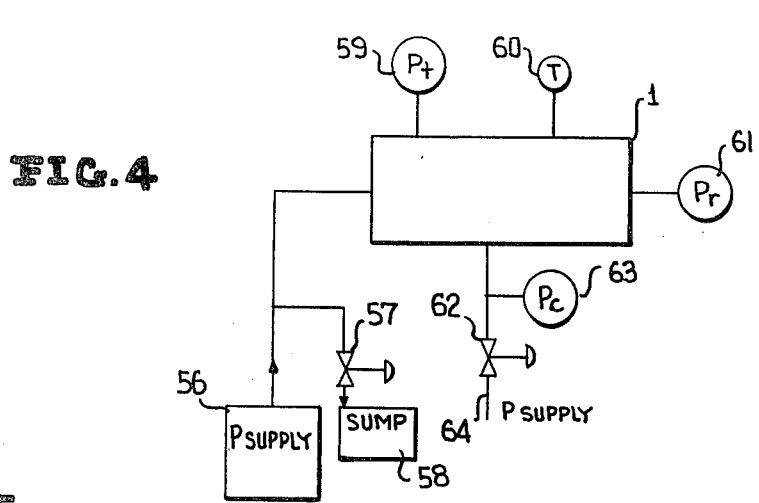
FIG. 4 is a schematic of the experimental equipment for measuring temperature of the working liquid.

Using a model of the types illustrated in FIGS. 3 and 14, and a test setup in accordance with the schematic in FIG. 4, a series of tests were run in support of the preceding analysis. In the apparatus of FIG. 4 there is provided a regulated supply 56 which furnishes fluid to the sensor-amplifier 1 which is immersed in hydraulic fluid at temperature which is the same as that of working fluid supplied to the power nozzle 3 of sensor amplifier 1. A regulator valve 57 discharges to a sump 58. $P_+$ pressure applied to power nozzle 3 is monitored by a pressure sensor 59 connected to fitting 10. Temperature is monitored by sensor 60, receiver 4 pressure Pr is monitored by pressure sensor 61 connected to fitting 8. Control pressure is applied to fitting 9 in response to regulator 62 and monitored by sensor 63. Control fluid is supplied from a convenient supply 64.

Because of the lack of precision temperature regulation on the hydraulic test stand, the approach taken was to let the temperature of the fluid rise naturally as work was done on the fluid by the pump of the test stand while holding $P_+$ constant. The rate of temperature rise of the hydraulic fluid could be controlled reasonably well by varying the amount of cool tap water admitted into the test stand heat exchanger. This test procedure proved entirely adequate, and the resulting data is shown in FIG. 2. The transition is seen to depend on temperature as anticipated. Shown in FIG. 2 is a comparison of the test and theoretical curves. The results show that the trend is correct, but that transition occurs earlier than expected. This can be attributed to factors relating to contamination of the working fluid, limitations of the testing apparatus and related factors.

Figure 5:
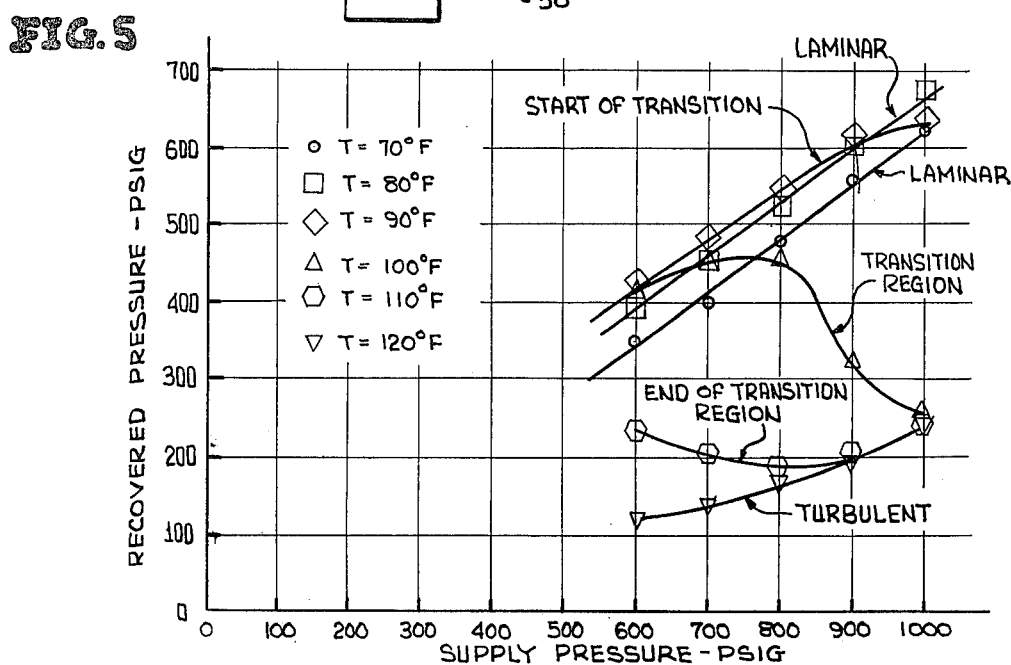
FIG. 5 presents a cross plot of the experimental data which permits the various stages of transition to be recognized.

Cross-plotting of FIG. 2 into FIG. 5 shows the familiar "knee" of the turbulence amplifier characteristic.

In FIG. 5, the various stages of transition, depending on temperature, can be recognized. In summary, $T \leq 80°$ F. — no evidence of transition
$T \approx 90°$ F. — transition begins
$T \approx 100°$ F. — complete transition range
$T \approx 110°$ F. — end of transition range
$T \geq 120°$ F. — transition complete, turbulent flow evidenced by the slope $dP_r/dP_+$ less than it was for 70° where the flow was laminar.

Figure 6:
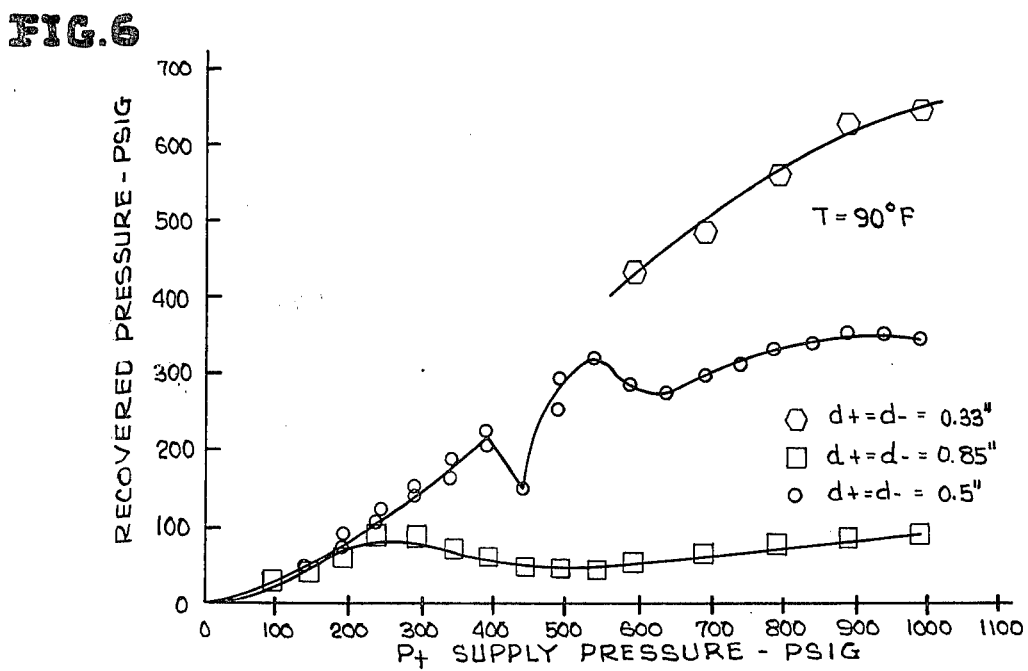
FIG. 6 presents data illustrating influence of test stand vibration on test data.

The effect of the vibration of the test stand may be seen in FIG. 6, where the temperature was manually controlled and held reasonably constant at 100° F. The supply pressure was gradually increased and the output pressure simultaneously recorded. At $P_+ \approx 400$, the output (recovered) pressure drops, then rises. Further increase in supply pressure shows the familiar "knee" of the curve. This sharp drop at $400 < P_+ < 500$ psi is due to the vibration of the hydraulic test stand at the most excitable frequency of the laminar jet at the Reynolds Number corresponding to $P_{30} = 450$ psi (nominally).

Another series of tests was conducted with the sensor-amplifier. At constant $P_+$ and reasonably constant temperature, the recovered pressure was recorded as a function of control pressure to nozzle 5. At 60° F., FIG. 7, the results show that transition does not occur, as the slope $dP_r/dP_c$ is that which would be derived from a momentum interaction of $P_+$ and $P_c$. FIG. 8 shows the test repeated at higher temperature, 80° F. Recall that FIG. 5 shows this point to be just prior to natural transition. Here the effect of the control flow is to bring about transition. In summary, it is apparent that a hydraulic fluid jet in hydraulic fluid ambient behaves essentially as does an air jet in air. But when this hydraulic jet is employed as a turbulence amplifier, with or without a control jet flow there exists a new potential for use as a high power and high gain analog amplifier, with a new gain control feature (temperature variation).

Referring now to FIG. 10 of the accompanying drawings there is presented data, in graph form, showing pressure recovery in a receiver versus temperature of the hydraulic fluid in the power jet for constant values of supply pressure. The data clearly demonstrates the capability of a hydraulic turbulence amplifier to monitor the temperature of the hydraulic fluid being used as a working fluid. This is particularly true when one examines a pair of curves such as that for supply pressures of 600 psig and 1000 psig as presented in FIG. 11. The crossover of these two curves permits implementation of a control system.

Figure 12:
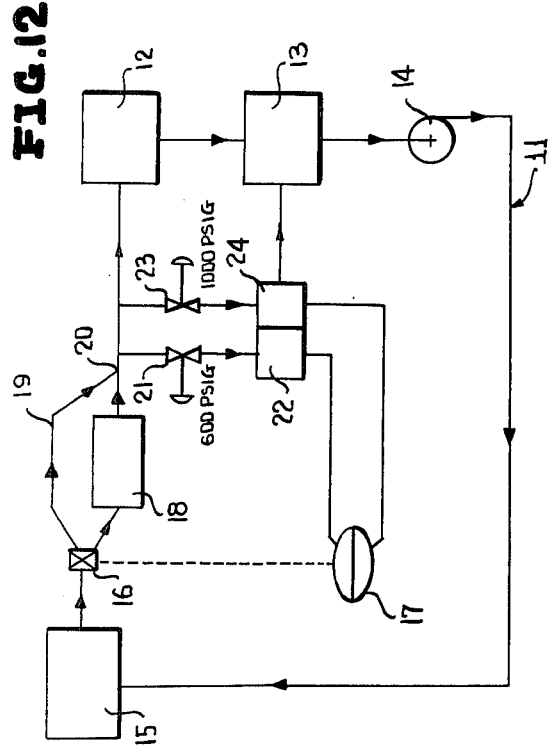
FIG. 12 presents a Working Fluid Fluidic temperature control system using two sensor-amplifiers.

FIG. 12 illustrates a "Working Fluid Fluidic Temperature Control System" using two sensor-amplifiers of FIGS. 3A and 3B. The sensor of this invention can be as illustrated in FIG. 14 and does not require presence of the optional control nozzle 5 in order to work as an input to the system presented in FIG. 12. Its presence provides the option to apply an override control signal by momentum interchange according to Horton U.S. Pat. No. 3,122,165 or by causing transition from laminar to turbulent jet flow under certain conditions some limitations of which have been previously described herein.

Two sensor-amplifiers of the type illustrated by FIGS. 3 or 14 are used in the control system of FIG. 12. Referring to FIG. 12 the hydraulic system 11 is being used to regulate the temperature of fluid being delivered to an environment chamber 12 which is being temperature regulated i.e. cooled to remove excess heat or heated to maintain a desired level of heat flow or desired level of environment temperature. In a closed system the temperature controlled fluid, hereinafter called TC fluid, is returned to sump 13. A pump 14 draws fluid from sump 13 and delivers it to a primary fluid supply subsystem 15 which delivers a regulated pressure fluid supply to diverter valve 16. The valve 16 is controlled by actuator means 17 to adjust the amount of fluid from the supply subsystem 15 that goes through the heat exchanger 18. The balance of fluid supplied to diverter valve 16 flows through the heat exchanger by-pass 19 and rejoins that fluid portion which has been diverted, through the heat exchanger 18, at mixing junction 20. The major portion of fluid flowing from mixing junction 20 flows to the environment chamber 12. A portion of the fluid flowing from mixing junction 20 flows through pressure regulator 21 as a supply to the power nozzle 3 of the first sensor amplifier 22 of a pair of sensor amplifiers of the type described for FIGS. 3 and 14. An additional portion of the flow from mixing junction 21 flows through a second pressure regulator 23 to a power nozzle 3 of a second sensor amplifier 24 of the pair mentioned.

Figure 11:
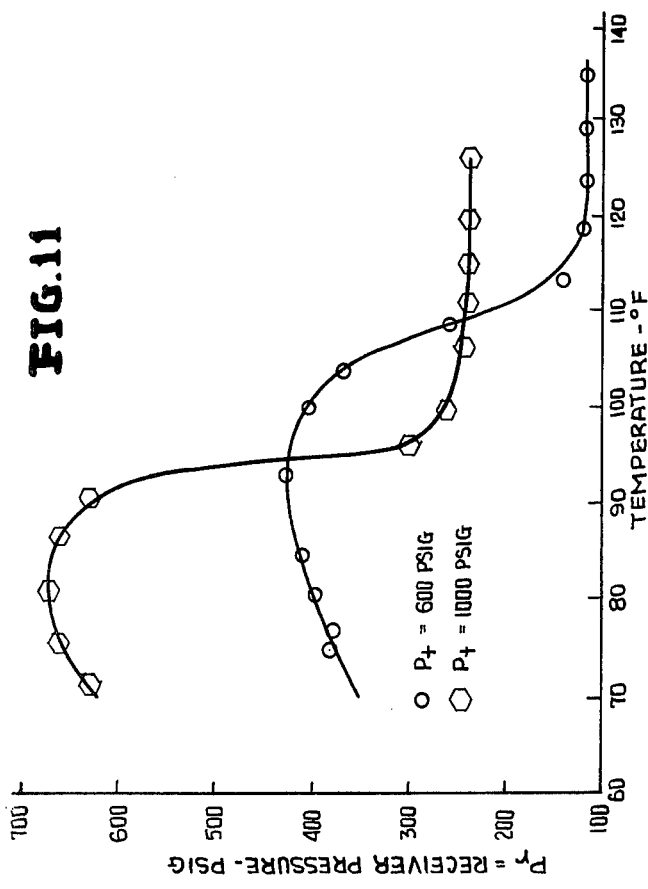
FIG. 11 presents the data of FIG. 10 for supply pressure levels of 600 and 1000 psig.

The supply pressure of the first sensor-amplifier 22 is regulated at a first pressure, for example 600 psig while $P_+$ of the second sensor amplifier 24 is regulated at a second pressure for example 1000 psig. The interaction regions 6 of both sensor amplifiers 22 and 24 are manifolded and dump to the sump 13. The outputs 8 of the receivers 4 of sensor amplifiers 22 and 24 are connected in push-pull fashion to the actuator 17 of diverter valve 16. Referring to FIG. 11 curve 25 illustrates the effect of working fluid temperature at sensor amplifier 22 power nozzle 3 input on the output signal which will result at receiver 4 and outlet 8 of sensor amplifier 22. Similarly, curve 26 illustrates the effect of working fluid temperature at the input of power nozzle 3 of sensor amplifier 24 on the output signal which will result at receiver 4 outlet 8 of sensor amplifier 24. If the heat exchanger 18 of FIG. 12 is to be operated as a cooler for the TC fluid then the actuator 17 is connected to the outputs of sensor amplifiers 22 and 24 so that when the output of sensor amplifier 22 is less than that of sensor-amplifier 24 the diverter valve 16 will divert working fluid to bypass 19 in preference to heat exchanger 18. When the output presure of sensor amplifier 22 exceeds that of sensor-amplifier 24 the above connection of actuator 17 will cause the diverter valve 16 to divert the working fluid to the heat exchanger 18 in preference to the bypass 19 and so reduce the temperature of the TC fluid flowing from mixing junction 20 and so modifying the temperature of fluid flowing to the environment chamber 12 and the sensor amplifiers 22 and 24. The result will be regulation of the proportioning of diverter valve 16 between heat exchanger 18 flow and bypass 19 flow to achieve the temperature corresponding to crossover 27 of FIG. 11. It is noted that the system must be manually overriden if the startup temperature is higher than that corresponding to second crossover point 28 or if for some non-standard reason temperature during operation at some condition exceeds that corresponding to the second crossover point 28. It is apparant that if the normal mode is to startup with a high temperature then the connection of actuator 17 can be reversed and the control will cause the TC fluid to seek the temperature corresponding to crossover point 28. In such event the manual override is required if TC fluid temperature drops below that of first crossover point 27 during some abnormal condition. Such manual override can be provided by application of a signal to the control connection 9 of the appropriate sensor-amplifier 24 or 22 in order to decrease the output signal of that sensor amplifier by overriding its sensor action with a srong control signal.

Figure 13:
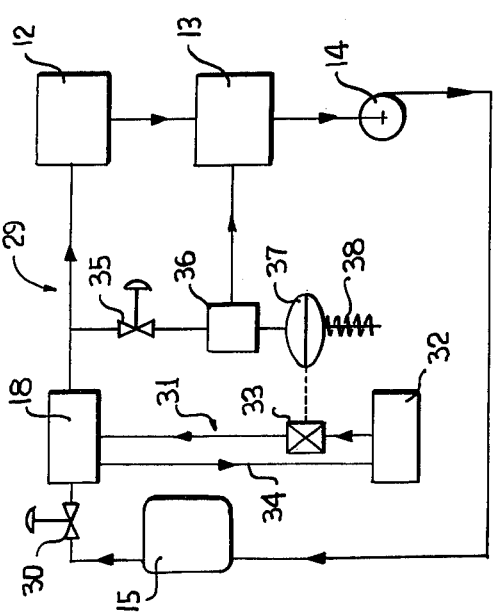
FIG. 13 presents a Working Fluid Fluidic temperature control system using a single sensor-amplifier.

FIG. 13 presents a similar Working Fluid Fluidic Temperature Control System but using a single sensor-amplifier 36. In FIG. 13 the numbering system is consistent with that of other figures. In FIG. 13 the hydraulic system 29 is being used to regulate the temperature of a TC fluid being delivered to an environment chamber 12 which is being temperature regulated, TC fluid discharges from the environment chamber to a sump 13. The pump 14 draws fluid from sump 13 and delivers it to a primary fluid supply subsystem 15 which delivers fluid through a pressure regulator 30 to a heat exchanger 18. In this case a low temperature coolant is circulated within a coolant subsystem 31 by a coolant supply unit 32 through a regulating valve 33 to heat exchanger 18 and back to the coolant supply unit 32 via return line 34. TC Fluid flows from the heat exchanger 18 to the environment chamber 12. A portion of TC fluid from the heat exchanger 18 flows through pressure regulating valve 35 to the power nozzle input connection 7 of sensor-amplifier 36. The output connection 8 of the receiver 4 of sensor amplifier 36 is connected to a single sided actuator 37 which adjusts regulating valve 33. A manually adjusted spring bias load 39 opposes that force generated by the output of sensor amplifier 36. Referring to FIG. 10 which presents the relationships between sensor-amplifier 1 output signal $P_r$ and the temperature and pressure of TC fluid i.e. working fluid applied to the power nozzle supply connection 7 it is readily apparant that adjusting the $P_+$ level permits one to adjust the temperature versus output signal relationship of the sensor-amplifier 36. Further adjustment of the spring bias load 38 of actuator 37 permits fine adjustments of the relationship between coolant flow through regulating valve 33 and the output signal of sensor-amplifier 36 which actuates actuator 37. In this fashion the system 29 as a whole is able to accomodate variations in heat load applied by the environment chamber 12 to the system 29 and variations of behavior of the coolant supply unit 32 which would otherwise cause the coolant subsystem 31 operation to adversely effect temperature of TC fluid being delivered to environment chamber 12.

In the system 11 push-pull action of the two sensor-amplifiers 22 and 24 with the settings of their respective pressure regulators 21 and 23 provide an absolute rather than a relative temperature reference. In the system 29 reliance is upon the pressure regulator 35 and the sensor-amplifier characteristics above to provide the absolute rather than a relative temperature reference.

FIG. 14 presents a sensor-amplifier 39 having no control jet nozzle. Working fluid is supplied to fitting 7 and feeds power nozzle 3 at a $P_+$ level that can be monitored at fitting 10. The jet is initially laminar as it enters interaction region 6 and proceeds to impact receiver 4 which is connected to fitting 8. Pressure $P_n$ at fitting 8 is the output signal of the device. The distance between the exit of power nozzle 3 and the location along the power jet at which the jet starts the transition from laminar to turbulent flow is a function of the level of $P_+$, the dimensions of the power nozzle 3 and the properties of the working fluid. When the $P_+$ level is maintained constant and the fluid properties are such that the receiver pressure at fitting 8 is to the right of the "knee" of the curve, as for example to the right of the peak pressure level of a curve of FIG. 10, then the output, pressure at fitting 8 will change rapidly with change of fluid temperature as for example as shown in FIG. 10 for one hydraulic fluid. There are no highly critical dimensions to obtain a working sensor amplifier except that the power jet nozzle 3 and receiver 4 should be reasonably well aligned on the same centerline. Open ends of the power jet nozzle 3 and receiver 4 can be chamfered to reduce signal noise. The power jet nozzle 3 is typically 20 to 80 diameters long having smooth interior, circular cross section and no burrs. Separation between the power nozzle 3 exit and receiver 4 entrance is of the order of ten 10 times the power nozzle 3 inside diameter. Receiver 4 ID can be as large as power nozzle 3 ID.

Reynolds number can be used for similarity calculations. Crossover of the curves as shown in FIG. 10 is a function of the combined effects of the temperature dependent fluid properties and will normally be different for different fluids.

The sensor-amplifier of FIG. 14 can be used as a configuration for sensor amplifiers 22 or 24 or 36 of FIGS. 12 and 13.

The results of the above work are very promising. They show that an analytic evaluation of the performance of the hydraulic sensor-amplifier does provide prediction of the trends of its performance. The experiments show further that transition does occur at the very high pressure levels predicted and that there is a significant difference between the output pressures before and after transition with a constant supply pressure.

In summary it is shown that a control signal can be applied in several ways, either through change of the viscosity and density of the working fluid or by application of an external jet to cause triggering or deflection of the power jet and that the gain in such cases can be designed to be significant. For example, sensors can be provided having a sensitivity of 2000 psi per degree Fahrenheit for a temperature signal under extreme conditions or pressure gains of as high as 75 per stage and higher can be achieved through appropriate design. Further, modes of operation have been exhibited which provide output signal crossover to enable supply regulation of the working fluid viscosity using the fluid itself as a sensing means. It is apparent from the analysis that very high power level amplifiers can be designed for operation at the high pressure levels normally associated with hydraulic actuators.

The amplifier packaging envelope is extremely promising when compared with conventional servo-valve practice. Separation between the power nozzle and receiving aperture is of the order of 10 $d_+$. The absence of moving parts insures a low cost, at least an order of magnitude lower than that of conventional, precision servo-valves. When considering a hydraulic turbulence amplifier alone there is a tradeoff between desire for sensing ability and the desire for insensitivity to environmental conditions. The saving factor is the control capability offered by the crossover exhibited in FIG. 11, so that a solution to the temperature sensitivity is immediately available through design of temperature regulators for the system of that accuracy adequate to the performance requirements of the system for using the system of FIG. 12.

From the preceeding one can readily envisage the capabilities to
1. performing sensing functions not previously feasible;
2. providing high gain operational amplifiers with a minimum complexity;
3. providing through feedback, a new three-term controller capability in hydraulics;
4. the ability to provide digital logic at high power levels of any desired complexity and
5. the ability to provide high power amplification and high pressure level/high power level output servo amplifiers — all of these without the need for moving parts.

While the preceeding has described use of conventional diverter valves, conventional moving part actuators, and conventional throttle valves, it is apparent and intended that in those cases where appropriate one can make use of fluidic diviter valves, vortex throttles, multi-phase vortex throttles etc. as described in the patent art. Further the use of fluids other than that of FIG. 1 for other design conditions is a natural result of this invention.

While I have described and illustrated several specific embodiments of my invention, it will be clear that variations of the details of construction which are specifically illustrated and described may be resorted to without departing from the true spirit and scope of the invention as defined in the appended claims.

I claim:
1. A high pressure hydraulic turbulence amplifier comprising generally coaxial and spaced power nozzle and receiving orifice separated by a reaction region, means for issuing a liquid having laminar flow characteristics from said power nozzle, across said reaction region and into said receiving orifice, said reaction region containing the same liquid as issued from said power nozzle, the density-viscosity parameters of the liquid, the liquid pressure supplied to the power nozzle and the diameter of said power nozzle being interrelated such that upon variation of said density-viscosity parameters of said liquid by a prescribed amount said laminar stream becomes turbulent in said reaction region, and means for producing turbulence of said laminar stream said last mentioned means including intersecting said laminar stream with a liquid of higher temperature in said reaction region.

2. The combination according to claim 1 wherein the pressure of said liquid is at least in the range of 75 to 1200 pounds per square inch gauge and wherein the temperature of said liquid is at least in the range of 60° F. to 250° F. inversely.

3. The combination according to claim 1 wherein the relationship of the parameter of said liquid and the diameter of said power nozzle are interrelated by the following equation:

$$\sqrt{\frac{0.97P}{0.8954 - 0.00034(t)}} \frac{d}{v} = 3.82 \times 10^{-2}$$

where P is supply pressure, $d$ is power nozzle diameter, $t$ is degrees Fahrenheit and $v$ is fluid kinematic viscosity.

4. A temperature sensing device having two turbulence amplifiers according to claim 1, means for supplying liquids at preselected and fixed different input pressures to said power nozzles of said amplifiers such that at at least one common temperature of said liquids the output pressures at said receiving orifices of both said amplifiers are substantially identical and means for determining when said output pressure bear a predetermined relationship to one another.

5. A temperature regulator comprising the apparatus of claim 4 comprising means for controlling the temperature of the liquid supplied to both said power nozzles, said means for controlling being responsive to said means for determining.

6. A temperature device comprising a turbulence amplifier according to claim 1, a pressure standard and means for determining when the pressure of said pressure standard and the pressure of said receiving orifice of said turbulence amplifier bear a predetermined relationship to one another.

* * * * *